United States Patent
Schluetter et al.

(10) Patent No.: US 10,942,638 B2
(45) Date of Patent: *Mar. 9, 2021

(54) METHOD AND SYSTEM FOR DISPLAYING A CURSOR ON A TRADING SCREEN

(71) Applicant: Trading Technologies International, Inc., Chicago, IL (US)

(72) Inventors: Jens-Uwe Schluetter, Ridgefield, CT (US); Robert A. West, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,945

(22) Filed: Feb. 13, 2019

(65) Prior Publication Data
US 2019/0179524 A1 Jun. 13, 2019

Related U.S. Application Data

(63) Continuation of application No. 14/738,286, filed on Jun. 12, 2015, now Pat. No. 10,241,664, which is a
(Continued)

(51) Int. Cl.
*G06F 3/0481* (2013.01)
*G06F 3/0484* (2013.01)
(Continued)

(52) U.S. Cl.
CPC ...... *G06F 3/04847* (2013.01); *G06F 3/04812* (2013.01); *G06F 3/04842* (2013.01);
(Continued)

(58) Field of Classification Search
CPC ........ G06Q 30/06; G06Q 20/10; G06Q 40/00; G06F 3/04847; G06F 3/04812; G06F 3/04842
See application file for complete search history.

(56) References Cited

U.S. PATENT DOCUMENTS

| 5,598,183 A | 1/1997 | Robertson et al. |
| 5,801,698 A | 9/1998 | Lection et al. |

(Continued)

FOREIGN PATENT DOCUMENTS

| JP | H7-234772 A | 9/1995 |
| JP | H10-21036 A | 1/1998 |

(Continued)

OTHER PUBLICATIONS

Supplementary European Search Report Application No. 04813087.6, dated Jan. 12, 2015 (dated Feb. 10, 2015).
(Continued)

*Primary Examiner* — Namitha Pillai

(57) ABSTRACT

A method, system, and computer program products are provided for updating the location of a cursor in a display window on a trading screen when certain events occurs. In a preferred embodiment, as market conditions change, the market information may be rearranged on a screen. To reduce the chances of missing a market opportunity by sending orders or managing them, the cursor moves in association with the market information such that the cursor appears fixed to the market information until a user moves the pointer device.

12 Claims, 6 Drawing Sheets

Related U.S. Application Data continuation of application No. 13/400,412, filed on Feb. 20, 2012, now Pat. No. 9,087,360, which is a continuation of application No. 13/013,792, filed on Jan. 25, 2011, now Pat. No. 8,161,414, which is a continuation of application No. 10/729,123, filed on Dec. 5, 2003, now Pat. No. 7,908,570.

(51) Int. Cl.
G06Q 20/10 (2012.01)
G06Q 40/00 (2012.01)
G06Q 40/06 (2012.01)
G06Q 40/04 (2012.01)

(52) U.S. Cl.
CPC ............ *G06Q 20/10* (2013.01); *G06Q 40/00* (2013.01); *G06Q 40/04* (2013.01); *G06Q 40/06* (2013.01); *Y10S 715/962* (2013.01)

(56) References Cited

U.S. PATENT DOCUMENTS

| | | |
|---|---|---|
| 6,766,304 B2 | 7/2004 | Kemp, II et al. |
| 6,865,719 B1 | 3/2005 | Nicholas, III |
| 6,993,707 B2 | 1/2006 | Baker et al. |
| 7,035,170 B2 | 4/2006 | Narayanaswami et al. |
| 7,139,034 B2 | 11/2006 | Kennedy et al. |
| 7,908,570 B2 | 3/2011 | Schluetter et al. |
| 8,161,414 B2 | 4/2012 | Schluetter et al. |
| 9,087,360 B2 | 7/2015 | Schluetter et al. |
| 2002/0032637 A1 | 3/2002 | Moshal et al. |
| 2002/0057285 A1 | 5/2002 | Nicholas, III |
| 2002/0059129 A1 | 5/2002 | Kemp et al. |
| 2002/0120551 A1 | 8/2002 | Clarkson |
| 2003/0004853 A1 | 1/2003 | Ram et al. |
| 2003/0009411 A1 | 1/2003 | Ram et al. |
| 2003/0115117 A1 | 6/2003 | Sugimoto |
| 2003/0189670 A1 | 10/2003 | Kennedy et al. |
| 2004/0218472 A1 | 11/2004 | Narayanaswami et al. |
| 2005/0034063 A1 | 2/2005 | Baker et al. |
| 2005/0091262 A1 | 4/2005 | Cao |
| 2005/0125328 A1 | 6/2005 | Schluetter et al. |
| 2006/0265239 A1 | 11/2006 | Schluetter et al. |
| 2006/0265240 A1 | 11/2006 | Schluetter et al. |
| 2011/0125630 A1 | 5/2011 | Schluetter et al. |
| 2012/0150718 A1 | 6/2012 | Schluetter et al. |
| 2015/0277740 A1 | 10/2015 | Schluetter et al. |

FOREIGN PATENT DOCUMENTS

| | | |
|---|---|---|
| JP | 2000-163191 A | 6/2000 |
| JP | 2002-352079 A | 6/2002 |
| JP | 2002-373042 A | 12/2002 |
| JP | 2005-063409 A | 3/2005 |
| JP | 2005-523506 A | 8/2005 |
| JP | 2014-512055 A | 5/2014 |
| WO | 01/65403 A2 | 9/2001 |
| WO | 02/065258 A2 | 8/2002 |
| WO | 03/090032 A2 | 10/2003 |
| WO | 12/141906 A1 | 10/2012 |

OTHER PUBLICATIONS

International Search Report of International Application No. PCT/US2004/040708, dated Feb. 6, 2006 (dated Feb. 13, 2006).

User Guide V4.60 LIFFE Connect for Futures by GL Trade, Jun. 1999, London, United Kingdom, DX 605, G 123548-G 123603, DTX 605.

|  |  | 35 | 143 | ← 802 |
|---|---|---|---|---|
|  |  | 100 | 142 | |
|  |  | 75 | 141 | ← Best Ask Price |
|  | 20 |  | 140 | ← Best Bid Price |
|  | 125 |  | 139 | |
|  | 20 |  | 137 | |

FIG. 8

|  |  | 10 | 146 |
|---|---|---|---|
|  |  | 25 | 144 |
| Best Ask Price → |  | 15 | 143 | ← 802
| Best Bid Price → | 35 |  | 141 |
|  | 20 |  | 140 |
|  | 125 |  | 139 |

FIG. 9

METHOD AND SYSTEM FOR DISPLAYING A CURSOR ON A TRADING SCREEN

CROSS REFERENCE TO RELATED APPLICATIONS

This application is a continuation of U.S. patent application Ser. No. 14/738,286 filed Jun. 12, 2015, now U.S. Pat. No. 10,241,664, which is a continuation of U.S. patent application Ser. No. 13/400,412 filed Feb. 20, 2012, now U.S. Pat. No. 9,087,360, which is a continuation of U.S. patent application Ser. No. 13/013,792 filed Jan. 25, 2011, now U.S. Pat. No. 8,161,414, which is a continuation of U.S. patent application Ser. No. 10/729,123 filed Dec. 5, 2003, now U.S. Pat. No. 7,908,570, the contents of each of which are fully incorporated herein by reference for all purposes.

FIELD OF INVENTION

The present invention relates to a computer-based method for displaying a cursor on a graphical interface used in displaying market information received from an electronic exchange to trade one or more tradable objects.

BACKGROUND

An exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functionally rich way.

With respect to electronic exchanges, buyers and sellers log onto an electronic exchange through their user terminals. A user terminal usually consists of a personal computer, laptop, or workstation that has a Microsoft Windows-type operating system that provides a graphical interface based on windowed regions on the screen and a pointing device such as a mouse. Certainly, the user terminal may include other types of computing devices and might use other types of operating systems such as a Unix-type operating system to trade in a market.

Once logged onto an electronic exchange, buyers and sellers may typically choose which tradable objects to trade because an electronic exchange often hosts a variety of electronic markets such that each electronic market represents a different tradable object. As used herein, the term "tradable object," refers simply to anything that can be traded with a quantity and/or price. It includes, but is not limited to, all types of tradable objects such as financial products, which can include, for example, stocks, options, bonds, futures, currency, and warrants, as well as funds, derivatives and collections of the foregoing, and all types of commodities, such as grains, energy, and metals. The tradable object may be "real," such as products that are listed by an exchange for trading, or "synthetic," such as a combination of real products that is created by the user. A tradable object could actually be a combination of other tradable objects, such as a class of tradable objects.

After a selection of the electronic market(s) is made, traders may access the market's order book that typically lists unexecuted buy and sell orders for the tradable object. Referring to FIG. 1, an example of the communications that might occur between an electronic exchange and a user terminal is shown. During a trading session, market data 104 in the form of messages is relayed over communication link 108 to user terminal generally indicated as 100. Intermediate devices such as a gateway may be used to facilitate communications over communication link 108.

By way of illustration, market data 104 contains information that characterizes the market's order book and most often includes the inside market, which represents the lowest sell price (also referred to as the best or lowest ask price) and the highest buy price (also referred to as the best or highest bid price). In some electronic markets, market data 104 might also include market depth, which generally refers to quantities available in the market at certain buy price levels and quantities available in the market at certain sell price levels. In addition to providing the market's order book information such as price and quantity information, electronic exchanges can offer other types of market information such as the open price, settlement price, net change, volume, last traded price, the last traded quantity, and order fill information.

As market data 104 is received at user terminal 100, the information may be displayed to the trader on a computer screen 102. Upon viewing the market information or a portion thereof, a trader may wish to take actions such as send orders to a market, cancel orders in the market, change orders in the market, query an exchange, and so on. To do so, the trader may input various commands or signals into the user terminal 100, for example, by using one or more conventional means for inputting information such as typing into a keyboard, inputting commands through a mouse, through a touch-screen, or inputting commands or signals through some other input device generally indicated by 110.

Upon receiving one or more commands or signals from the trader at 110, user terminal 100 may generate messages that reflect the actions taken generally shown as 106. In addition to or in place of manual entry, a trader might use automated trading software that automatically or semi-automatically generates transaction information. Of course, there are many different types of messages and/or order types that can be submitted to an electronic exchange, all of which may be considered various types of transaction information. Once generated, action messages 106 are sent from user terminal 100 to the appropriate electronic market.

It is worth noting that multiple elements of an order must usually be entered prior to an order being sent to market. Such elements or order parameters include, among other things, the desired price, the quantity and whether a buy or a sell order is desired. The more time a trader takes entering an order, the more likely the price on which he wanted to bid or offer will change or not be available in the market. The market is fluid as many traders are sending orders to the market simultaneously. It fact, successful markets strive to have such a high volume of trading that any trader who wishes to enter a market order will find a match and have the order filled quickly, if not immediately. In such liquid markets, the prices may fluctuate rapidly. On a trading screen, this results in rapid changes in the price and quantity fields within the display.

Therefore, recent trading software applications have employed the use of pointing devices to perform multiple actions such as sending an order to market with only one or two clicks of the pointing device. One of the most common pointing devices is a mouse that typically includes a main body, left and right buttons, and more enhanced versions sometimes include a wheel positioned between the left and right buttons. Other types of pointing devices may also be used such as keyboard cursors or trackball, just to name a few. Regardless of the actual pointing device used, a pointer or on-screen cursor in the form of an arrow, or some other identifier, is displayed on the screen and may be used to highlight information, set order parameters, send orders, cancel orders, and so on. The movement of the on-screen cursor is controlled by the relative movement of the pointing device by the user.

A pointer or on-screen cursor are important to traders interested in making fast and accurate trades. For most traders, market data 104 is updated on their screens 102 quickly to reflect fast changes in the market, and therefore, values on the screen 102 move or change at a rapid pace. More often than not, it is up to the trader to quickly and accurately move the on-screen cursor to a desired location to set order parameters or input a buy order or a sell order, for instance. To illustrate this further, FIGS. 2 and 3 show a type of graphical user interface that may be used to trade a particular tradable object.

FIG. 2 shows a window 200 that would ordinarily be displayed on computer screen 102 to display the market's order book information to the trader. In particular, window 200 shows aggregate buy and sell orders that are currently in the market and such orders correspond to a price along the price column ("Prc"). For instance, the best bid is for a quantity of "20" at a price of "140" and the best ask is for a quantity of "75" at a price of "141." Other bid and ask quantities are also shown for sake of illustration. Furthermore, included in window 200 is an on-screen cursor in the form of an arrow 202, of course, the on-screen cursor may take any form. Arrow 202 is controlled by the relative movement of a pointer device by the user. For sake of illustration, assume that arrow is placed over the third cell from the top of the price column which for now shows the price of "143." Using a typical trading application and the trading screen shown in FIG. 2, once the user depresses a button with the cursor hovering over "143" a sell order would be loaded with a preset quantity and would then be waiting for a final command to be sent to the exchange at a price of "143." In other types of trading applications, the sell order could also be sent to the exchange upon the very same button depression.

FIG. 3 shows the same window 200 as in FIG. 2, only the market conditions have quickly changed such that the inside market has moved up in price. Consequently, the prices have automatically moved to maintain the current inside market prices (e.g., the best ask at "144" and the best bid at "142") in the center of the window 200. Assuming the user did not move the pointer device during this quick shift in the market, arrow 202 would remain fixed in position on the window and it would now be currently placed over the price of "145." And just while the trader was reflecting on the previous market conditions shown in FIG. 2, she decided to send a trader order at a price of "143;" (the price over which the cursor was previously positioned). As such, the trader was set in motion to send an order, however, the screen has just been updated to reflect the change in market conditions. Unfortunately, now the cursor is hovering over "145" an order is instead loaded at an undesirable price of "145." The trader missed her price.

FIGS. 2 and 3 illustrated one price movement in the market on one type of trading display, but one can imagine the many price movements that can occur during a trading session. This requires that the buyer or seller be aware of the price movements at all times, and have the cursor ready to take action, as if the trader intends to enter an order at a particular price, but misses the price because the market prices moved before the order was entered, the trader may lose hundreds, thousands, or hundreds of thousands of dollars. The same might be true if the trader missed an order delete because the price moved away. The faster a trader can trade, the less likely it will be that the trader will miss her price.

BRIEF DESCRIPTION OF THE DRAWINGS

Many aspects of the present embodiments can be better understood with reference to the following drawings. The components in the drawings are not necessarily to scale, emphasis instead being placed upon illustrating example embodiments of the present invention.

FIGS. 8 and 9 are block diagrams of another type of trading screen showing an arrow controlled by a process of the type set forth in FIG. 5.

DETAILED DESCRIPTION

I. Overview

The present embodiments include methods, systems, and computer program products for updating the location of a cursor on a trading screen. In the present embodiments, traders use software that creates specialized interactive trading screens to, among other things, enable the traders to enter orders, obtain market information, and monitor positions. The software frequently updates the trading screens as market conditions change. During which time, the cursor moves in association with an item of interest in the market information such that the cursor appears fixed in relation to the item of interest until the trader moves the pointer device.

In an embodiment of the present embodiments, the cursor moves in association with prices displayed to a trader. According to this embodiment, software allows a trader to set the price for an order by selecting a price from the trading screen with an input device. Also, this allows a trader to easily manage working orders (e.g., delete or change order parameters) that are associated with a price. As the price (and order) information is updated on the trading screen, the location of the cursor automatically moves in association with the price movements. That way, if a trader intends to enter an order at a particular price, for example, the trader will have an increased chance of selecting the price as the cursor will preferably appear fixed in relation to the prices. In addition, if the trader intends to delete or cancel an order at a particular price, for example, the trader will have an increased chance of selecting the exact order to delete, given that the order icon may move in association with the prices.

Other systems, methods, features, and advantages of the present embodiments will be or become apparent to one with skill in the art upon examination of the following drawings and description. It is intended that all such additional systems, methods, features, and advantages be within the scope of the present invention, and be protected by the accompanying claims.

II. System Architecture

As will be appreciated by one of ordinary skill in the art, the present embodiments may be operated in an entirely software embodiment, in an entirely hardware embodiment, or in a combination thereof. For sake of illustration, however, the preferred embodiments are described in software-based embodiment, which is executed on a computer device. As such, the preferred embodiments take the form of a computer program product that is stored on a computer readable storage medium and is executed by a suitable instruction execution system in the computer device. Any suitable computer readable storage medium may be utilized including hard disks, CD-ROMs, optical storage devices, or magnetic storage devices, for example.

Figure 1:
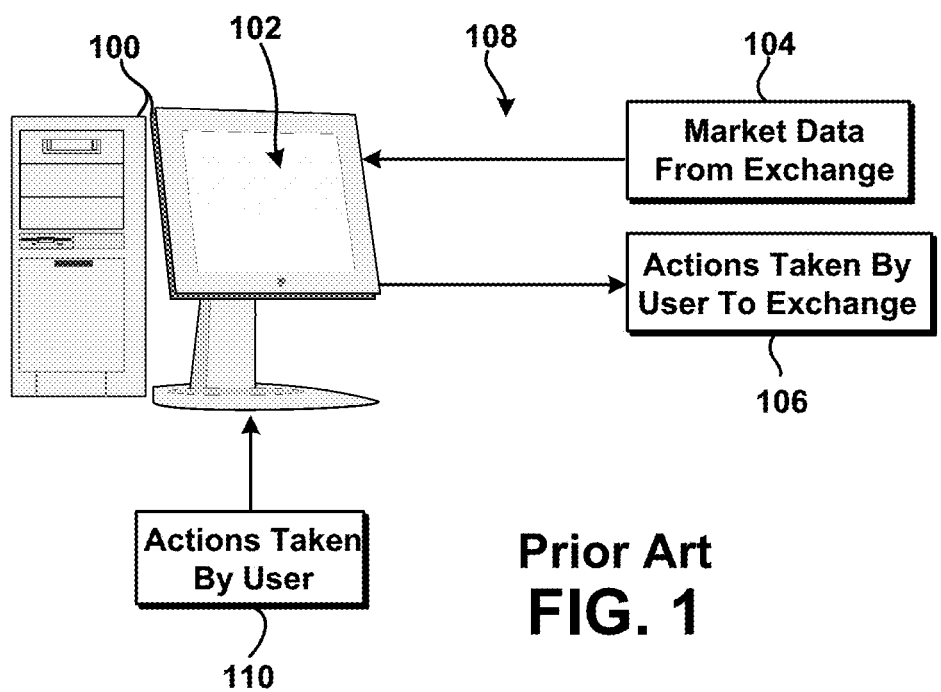
FIG. 1 is a block diagram that illustrates a conventional user terminal for receiving market data from an electronic exchange and for sending transaction information to the electronic exchange.
Figure 2:
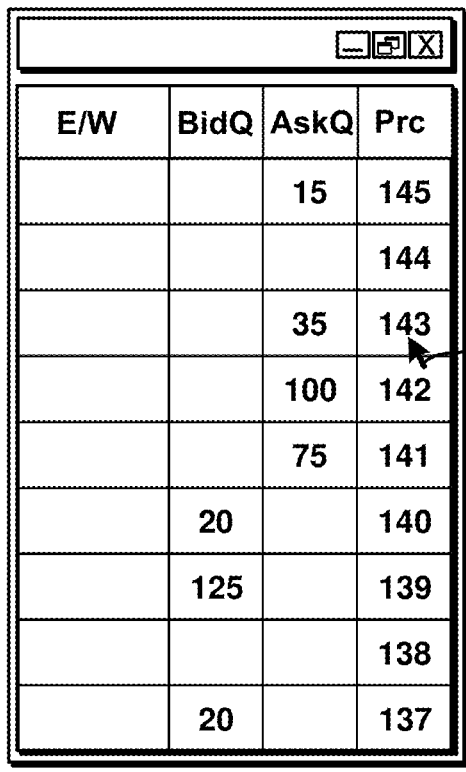
FIGS. 2 and 3 are block diagrams of a trading screen used for receiving and displaying market data and used for receiving inputs from a trader, and further showing an arrow controlled by a conventional mechanism.
Figure 3:
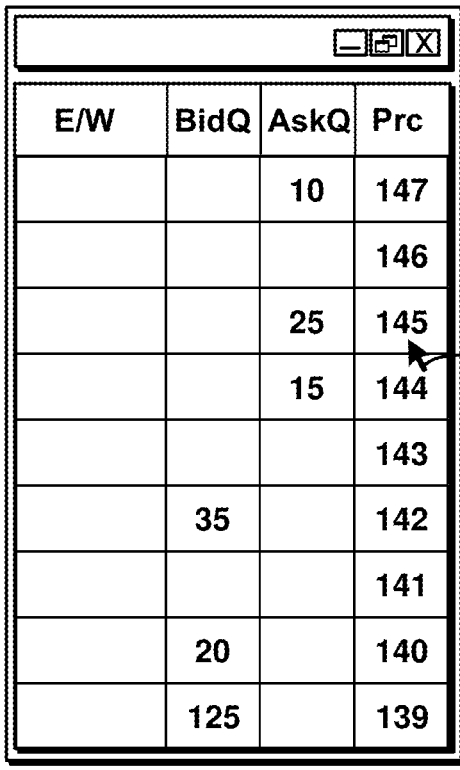
Figure 4:
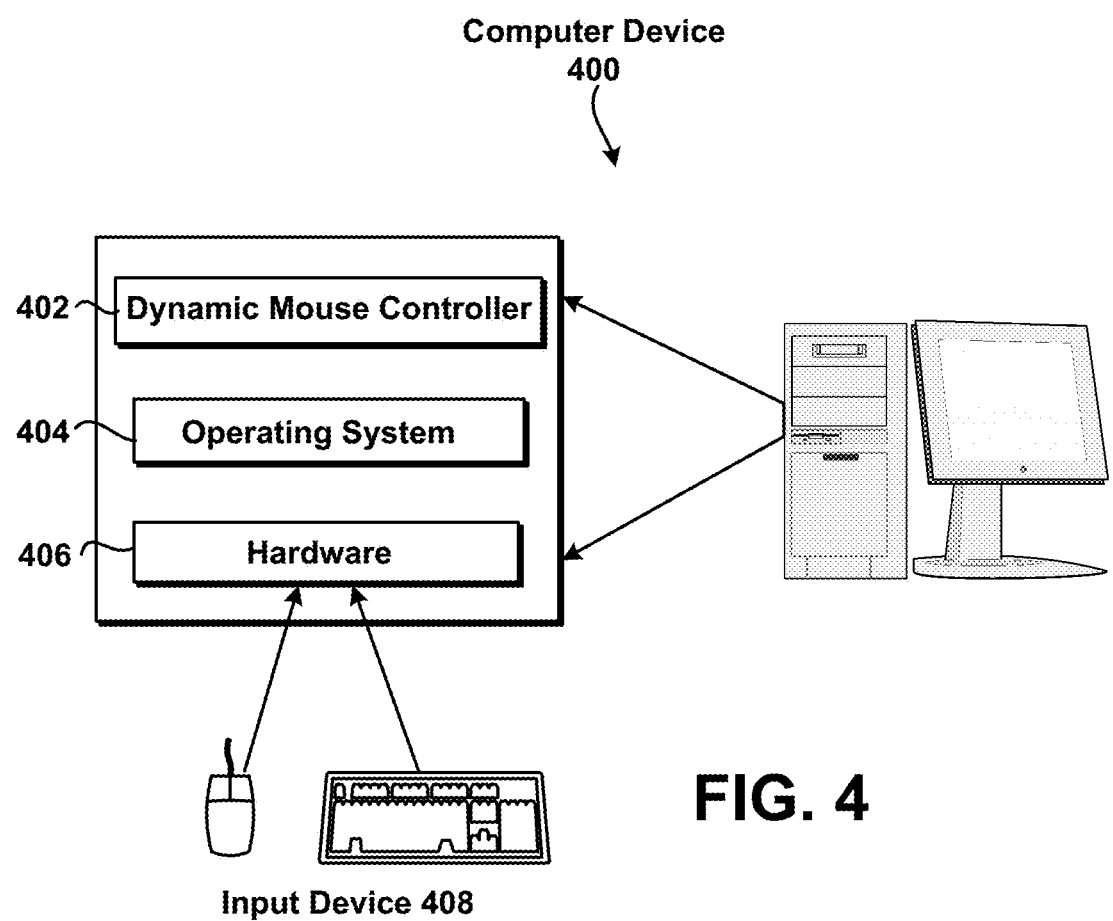
FIG. 4 illustrates an example schematic of a dynamic cursor controller along with an operating system and hardware components of a computer device.

With reference to FIG. 4, illustrated is a computer device 400 along with layers that define different stages that may be used to implement an embodiment of the present embodiments. The layers include dynamic cursor controller 402, operating system 404, and hardware 406. Computer device 400 preferably includes, among other things, at least a processor and a storage mechanism (both of which are not shown in the figure, but are well-known computer components) for storing and performing the functions described herein.

Operating system 404 may be used to manage hardware 406 and software resources of computer device 400. Operating system 404 general functions might include processor management, memory management, device management, storage management, application interface, and user interface. Any type of operating system 404 may be used to implement the present embodiments, and examples of common operating systems include Microsoft Windows family of operating systems, the UNIX family of operating systems, and the Macintosh operating systems. However, it will be recognized by those of ordinary skill in the art that the added complexity of an operating system may not be necessary to perform the functions herein. For example, an operating system may not be needed if the present embodiments were implemented in hardware using, for example, hardware components such as application specific integrated circuits (ASICs).

Hardware 406 may include special programs or drivers to interface peripheral input devices generally indicated as 408 such as a mouse or keyboard with operating system 404. In particular, hardware 406 may translate between electrical signals generated by an input device 408 and the programming languages of operating system 404. An input device 408 may be used to control an on-screen cursor. Example input devices include a mouse, keyboard, game pad, virtual glove, joystick, or trackball, just to name a few. An on-screen cursor may include any special indicator or icon that moves with movements of the input device 408. Example types of on-screen cursors include an arrow or some other graphical icon.

Dynamic cursor controller 402 is preferably a software application that interfaces with operating system 404 to update the location of an on-screen cursor. Dynamic cursor controller 402 looks for changes in the display of market information such that the position of the on-screen cursor needs to be automatically updated to a new location relative to the particular trading display. Dynamic cursor controller 402 is preferably implemented by a C+ or C++ based software program, though other suitable program languages can be utilized such as Java. Dynamic cursor controller 402 may be configured to work with any type of trading display to provide the functionality described herein.

Dynamic cursor controller 402 may be stored in a computer program product and loaded into computer device 400 using a removable storage drive, a hard drive, or a communications interface such as a serial port or USB connection. Alternatively, the computer program product may be downloaded to computer device 400 over a network. The control logic (software), when executed by the processor, causes the processor to perform the functions of the invention as described herein.

III. System Features

The following are features of the preferred embodiments that provide particular functionalities and utilities to electronic trading. The functionalities include the ability to update the location of a cursor in association with an item of interest that moves on a trading display to reduce the chances that a trader will miss a market opportunity. More specifically, the preferred embodiments may reduce the time it takes for a trader to place a trade or manage orders when electronically trading through a trading display. This, in turn, may increase the likelihood that the trader will have orders filled at desirable prices and quantities.

Figure 5:
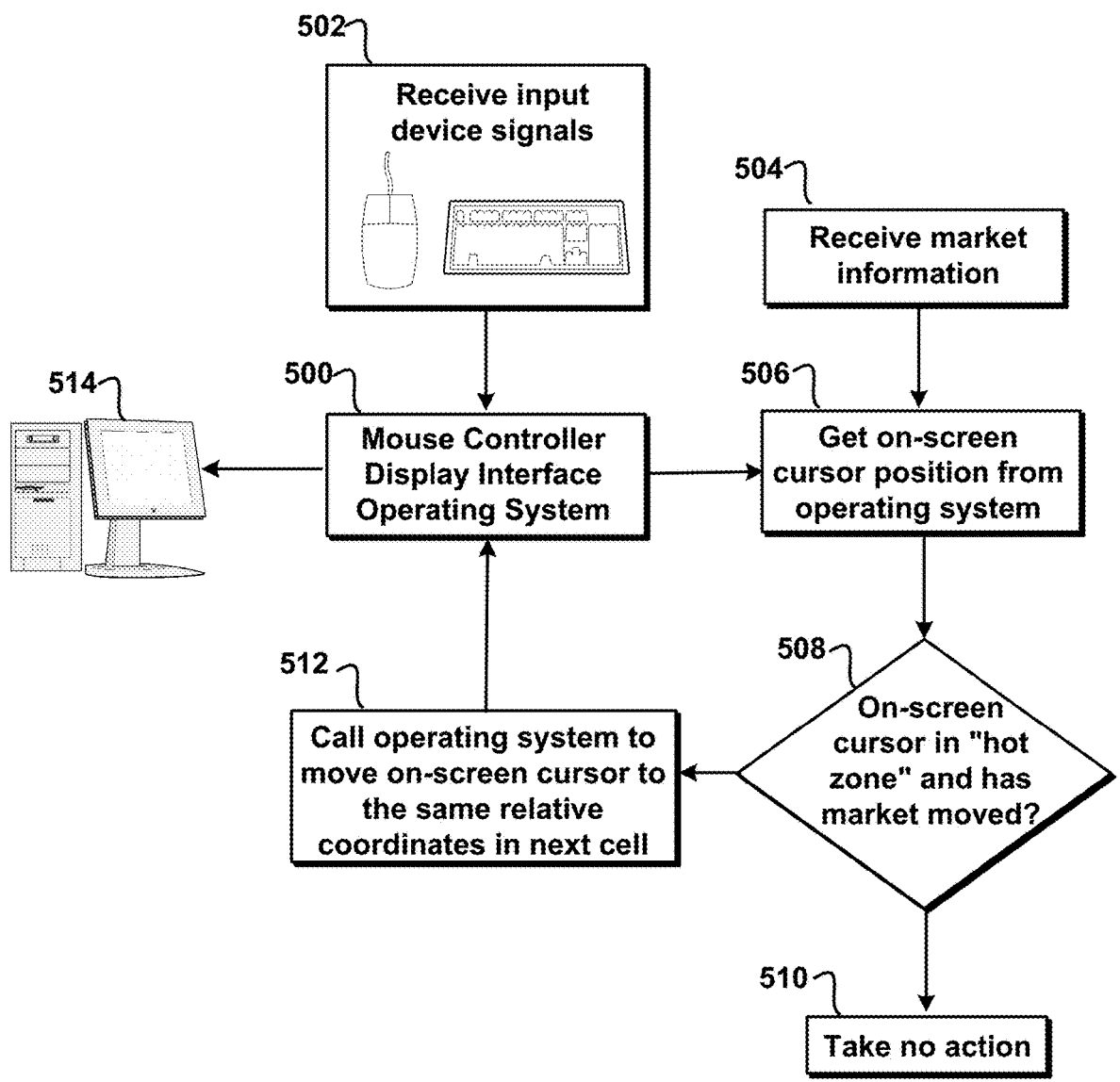
FIG. 5 is a flowchart illustrating a process for updating the position of a cursor on a display based on the movement in the market.

Turning now to FIG. 5, illustrated is a flowchart of an example embodiment for displaying a cursor on a trading screen. The flowchart of FIG. 5 shows the functionality and operation of a possible implementation of the present embodiments. In this regard, each block may represent a module, segment, or portion of code, which includes one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonable skilled in the art of the present invention.

At block 500, operating system 404 operates a cursor on a graphical display that is shown on trading screen 514 of a computer device. By way of illustration, many graphical output devices are of the raster type, and plot points. Each dot (or pixel) making up the display is mapped into memory, which may be directly accessed by the processor. The number of pixels on screen 514 is referred to as resolution and each pixel may be addressed in terms of the "x" and "y" coordinates. The cursor may be located at a particular (x, y) coordinate. Any alternatives to a coordinate system for mapping points on a display may be incorporated by the present embodiments by one of ordinary skill in the art.

At block 502, input signals are received from hardware, and in particular, from an input device such as a mouse or keyboard, for example. The input device can move the cursor to a different (x, y) coordinate based on the physical movement of the device. In addition, a user may move the cursor to a desirable location on the screen such as price (or to a location associated with the price) and click a button when a location is chosen. This identifies a pixel, which may be used to send orders at a price associated with the pixel or coordinates, for example. While a single click of the input device might be desirable to select a location, any action taken by a user, whether comprising one or more clicks or selections may be programmed to select a location.

At block 504, market information is received and displayed. Market information may be configured for display to the trader on screen 514 by a trading software application. The market information may be arranged in a graphical window, which may include only a portion of the computer screen and can be resized in either direction to a desired dimension. In addition, some trading software allows a user to position the cursor over a particular location in the window and click a button causing an order to be sent to an electronic exchange or causing initiation of an order (and then sending the order through a confirmation box, for example). While the present invention is not limited to the type of trading window, example types of trading windows are shown for purposes of illustration in FIGS. 6-9. The market moves in the window when a signal causes the computer to rearrange the market information on the display. The signal may include any type of single (software and/or hardware based), and may be automatically generated by the software or manually generated by the trader, for example.

At block 506, when the market has moved, dynamic cursor controller 402 gets the current coordinates of the cursor from operating system 404. Let us assume the current coordinates of the cursor are (X, Y), where X and Y may refer to a number or unit of measurement from a known point of origin preferably defined by the computer software or operating system 404.

Figure 6:
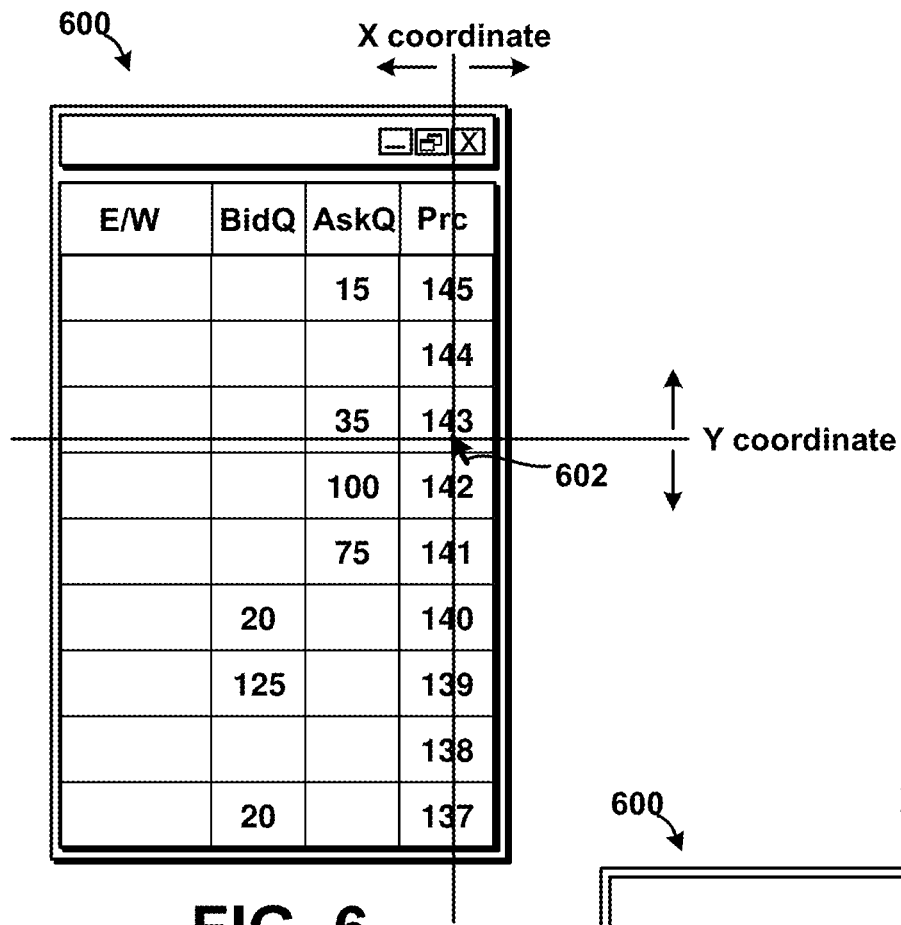
FIGS. 6 and 7 are block diagrams of one type of trading screen showing an arrow controlled by a process of the type set forth in FIG. 5.

At block 508, dynamic cursor controller 402 determines if the cursor is positioned in a "hot zone." A hot zone, as used herein, may be defined by the programmer of the trading application, or alternatively, by the user of the present embodiments if so desired. Referring briefly to FIG. 6, a hot zone might include price cells "137" through "145," such that if the trader selects a location associated with one of those prices, an order is set with the price corresponding to the cell selected. A cell is a uniquely identified section and may be displayed as a rectangular space that can hold text, a value, or a formula, for example. Other hot zones might include the bid quantity cells or ask quantity cells, for example. If the cursor is not in a pre-defined hot-zone, then preferably, no action is taken to update the position of the cursor at block 510. In other words, the cursor may be outside of the active trading area. It is worth noting that defining the hot-zone does not require the use of cells, rather it can be defined as any shape or size, down to the pixels (or smallest unit) of the graphical display.

At block 512, if the cursor is in a hot-zone, then the operating system 404 is called on to move the cursor to the same relative coordinates as the market movement. So, for example, if the price was originally associated with (X+1, Y) in block 506 (the cursor coordinates were (X, Y)) moved to a location at (X+1, Y+2), then the cursor would be updated to have the same relative coordinates (e.g., cursor would be moved from (X, Y) to (X, Y+2)), assuming the connected input device was not moved.

IV. System Examples

Examples are provided herein to illustrate some of the features of the present embodiments. Description of these examples is provided for convenience only. It is not intended that the invention be limited to application in these screen display environments. In fact, after reading the following description of the examples, it will become apparent to a person skilled in the relevant art how to implement the invention in alternative trading screen environments.

FIG. 6 illustrates a screen display and order entry system in accordance with the preferred embodiments. In particular, the current inside market of an example market is shown in screen display that is generally indicated as 600. The display 600 is a preferred display as it simplifies the trading system by entering and tracking market information in an efficient manner, though the present invention is not limited to a display. This type of display arranges market information in an easy to read fashion by orienting the bid quantities and ask quantities along a common price axis that move relative to the common price axis. The representative prices for the given tradable object are shown in a price column, where the prices are arranged in numerical order in increments. Prices may be of the static-type (prices normally do not move until a repositioning command is received) or of the dynamic-type display (prices normally do move), until however, the trading software receives a command to reposition or rearrange the market information on the screen.

In the example shown, the highest bid price is at "140" and the lowest ask price is at "141." A cursor 602 is currently positioned over price "143" with coordinates of (X, Y), where X and Y represent any number or unit of measurement from a known point of origin. A display like 600 allows a trader to enter orders directly into the window by selecting a price cell that is situated along the common axis, for example. So, upon a click of a button, for example, an order may be initiated with a preset quantity and the selected price (e.g., in this example, the selected price would equal a price of "143").

Figure 7:
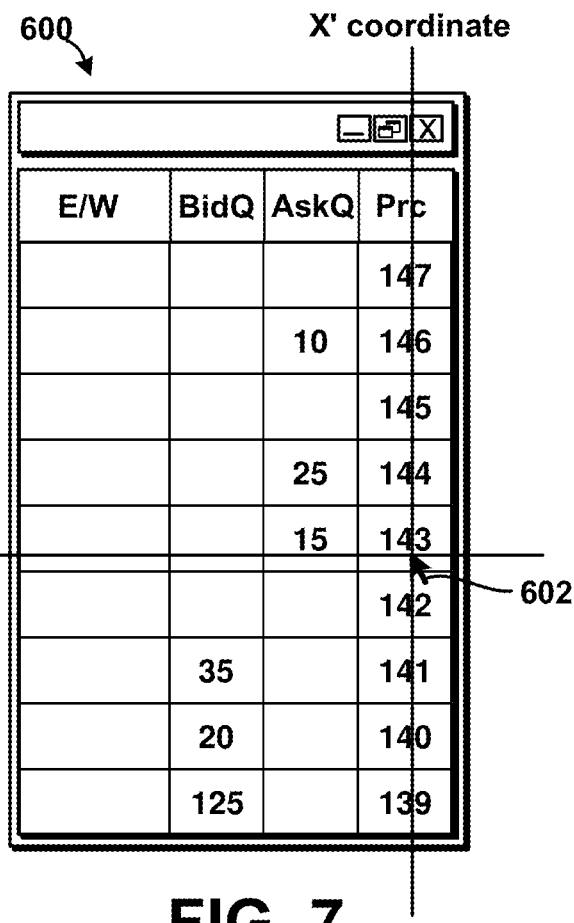

FIG. 7 illustrates the same screen display and order entry system of FIG. 6, except that the inside market has moved up to a highest bid price of "141" and a lowest ask price of "143." To keep the inside market near the center of the window, the trading application may reposition the market information on the display. In doing so, price "143" has moved to (X', Y') on the screen, where X' and Y' represent a different location than (X, Y). According to the preferred embodiments, dynamic cursor controller 402 moves the location of the cursor 602 from (X, Y) to (X', Y') to keep the on-screen cursor "fixed" in association with price "143," assuming the trader has not moved the cursor to another location. It is worth noting that the market information that is displayed may be rearranged or configured for any reason, and therefore, the present embodiments are not limited to occurrences when the trading software repositions the inside market in the center or near center of the display.

With reference to FIG. 6, if the market information has changed, but the market information was not repositioned, then preferably the cursor 602 would remain at its (X,Y) location along with price "143." That is to say, market information can change and the screen may be updated, but if the contents in the designated hot-zone do not move, then the on-screen cursor remains fixed until a user moves the input device. For example, a change in market information might include the situation where the quantity of "75" at the best ask price of "141" was reduced to "35," indicating that a quantity of "40" was matched (this example scenario is not shown in the figures).

FIG. 8 illustrates another type of screen display and order entry system in accordance with the preferred embodiments. Screen display of type 800 maintains the inside market in the center of the screen at all times (this type of screen display is similar to the type of display that simply maintains the inside market at the same location on a display at all times; another example of this type of screen is the Market Grid, which is commercially available from Trading Technologies International, Inc. of Chicago, Ill.). Therefore, when the inside market changes, the price values also change at those designated locations. For ease of comparing screen types in the figures, the market information shown in screen display 800 is the same as market information shown in FIG. 6. Likewise, with reference to FIG. 8, a cursor 802 is currently positioned over price "143."

FIG. 9 illustrates the screen display 800 of FIG. 8, except that the inside market has changed to a highest bid price of "141" and a lowest ask price of "143." In this example, the trading application, which generates the screen display 800, reconfigured the market information to display the new market information. Accordingly, dynamic cursor controller 402 automatically updates the location of the cursor to a location associated with "143." Again, this is assuming that the trader has not yet moved the cursor.

Of course, the present embodiments may be configured by one of ordinary skill in the art to work with any variety of market information screens that moves market information in any way to convey the current state of the market to the trader. Preferably, the market information screens show prices along an axis such that they can display "gaps" in the market (e.g., prices that do not have bid or ask quantities) as those displays can generally provide a more intuitive display of the market. An example of this type of display is shown in FIGS. 6 and 7.

However, the market information screens that do not show "gaps" may also be used. An example of this type of display is shown in FIGS. 8 and 9 (although displays of the type shown in FIGS. 8 and 9 may be configured by one of ordinary skill in the art to include "gaps"). Furthermore, in situations where the prices are removed from the display (e.g., when quantities at those prices are gone), the cursor may be fixed to the item of interest associated with the current location of the cursor. For example, with reference to FIG. 8, assume that the item of interest was "price" and the cursor was set to move in association with a particular price of "142." Then, the market display was updated and the price of "142" no longer appears in the display; see FIG. 9. In this example, instead of moving the cursor, the cursor will now track the movement of the price "144," which corresponds to the cursors current location. Accordingly, the cursor would track the movement of "144" until it too disappears from the display, at which time the cursor would track the movement of another price. Upon reading the teachings described herein, one of ordinary skill in the art will recognize the many other ways that the movement of cursor could be based on in such screens.

IV. Conclusion

The present embodiments provide a mechanism for use in trading electronically that preferably reduces the chances of a trader making the wrong trades at prices that are not desired, especially when using trading software that allows single click trading. Preferably, a trader may designate an item of interest, and once designated, the cursor automatically tracks the movement of the information as it is displayed on the trading screen. In the above examples, price information was used as the item of interest, but other items of interest may be selected such as bid or ask quantities, a trader's working orders, last traded price, or any other item of interest to the trader.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method comprising:
   receiving, via a computing device, a first user command to place a cursor on a first location of a dynamic price axis displayed on a trading screen of the computing device, the dynamic price axis being displayed according to market data received via the computing device from an electronic exchange, the first location having a price;
   in response to receiving the first user command, setting, via the computing device, a trade order with the price of the first location of the dynamic price axis; and
   subsequent to setting the trade order with the price:
      receiving, via the computing device, a market update from the electronic exchange,
      updating, via the computing device, the dynamic price axis displayed on the trading screen in response to receiving the market update, where the update includes changing the dynamic price axis to reposition the price to a second location of the dynamic price axis according to the market update; and
   subsequent to updating the dynamic price axis and prior to receiving another user command to cause the cursor to move to another location:
      maintaining, via the computing device, the price for the trade order, and
      receiving, via the computing device, a second user command to submit the trade order with the price to the electronic exchange.

2. The method of claim 1 where the first location is different from the second location.

3. The method of claim 1 further comprising submitting the trade order at the price.

4. The method of claim 1 where the dynamic price axis further comprises a plurality of locations.

5. The method of claim 4 where each location of the plurality of locations is configured to receive a user command to send trade orders to the electronic exchange.

6. The method of claim 1 where the second user command comprises any one of a single-click of a mouse button and a double-click of a mouse button.

7. The method of claim 1 further comprising displaying price levels for an inside market at designated locations of the dynamic price axis.

8. The method of claim 1 further comprising displaying along the dynamic price axis any of a last trade price for a tradeable object, a best bid price for a tradeable object, a best ask price for a tradeable object, and combinations thereof.

9. The method of claim 1 where the update to the trading screen further comprises repositioning the dynamic price axis in response to receiving a repositioning command.

10. The method of claim 1 further comprising:
    receiving a third user command to move the cursor to a new location having a new price; and
    in response to the third user command, changing the price of the trade order to the new price.

11. The method of claim 1 where maintaining the price for the trade order comprises moving the cursor to the second location of the dynamic price axis.

12. The method of claim 11 where the second user command is received subsequent to the cursor being moved to the second location.

\* \* \* \* \*